United States Patent [19]

Rietsch

[11] 4,320,471

[45] Mar. 16, 1982

[54] SEISMIC SURVEYING METHOD

[75] Inventor: Eike Rietsch, Houston, Tex.

[73] Assignee: Deutsche Texaco Aktiengesellschaft, Fed. Rep. of Germany

[21] Appl. No.: 952,018

[22] Filed: Oct. 16, 1978

[30] Foreign Application Priority Data

Oct. 29, 1977 [DE] Fed. Rep. of Germany ....... 2748707

[51] Int. Cl.³ .............................................. G01V 1/20
[52] U.S. Cl. ........................................ 367/49; 367/41; 367/43; 367/58; 367/62
[58] Field of Search ................. 367/20, 22, 41, 43, 367/56, 58, 62, 63, 49

[56] References Cited

U.S. PATENT DOCUMENTS

| | | | |
|---|---|---|---|
| 2,906,363 | 9/1959 | Clay, Jr. ................................ | 367/49 |
| 2,981,928 | 4/1961 | Crawford et al. .................... | 367/56 |
| 3,133,262 | 5/1964 | Strange ................................. | 367/20 |
| 3,221,297 | 11/1965 | Smith et al. ........................... | 367/49 |
| 3,259,878 | 7/1966 | Mifsud .................................. | 367/49 |
| 3,335,401 | 8/1967 | Kerns .................................... | 367/22 |
| 3,731,268 | 5/1973 | Landrum, Jr. ........................ | 367/41 |
| 3,852,708 | 12/1974 | Doolittle et al. ..................... | 367/20 |
| 3,885,225 | 5/1975 | Anstey et al. ........................ | 367/41 |
| 3,887,897 | 6/1975 | Neitzel et al. ........................ | 367/20 |
| 3,916,371 | 10/1975 | Broding ............................... | 367/43 |
| 4,004,267 | 1/1977 | Mayne ................................. | 367/41 |
| 4,037,190 | 7/1977 | Martin ................................. | 367/49 |
| 4,091,358 | 5/1978 | Bayhi ................................... | 367/20 |

Primary Examiner—Howard A. Birmiel
Attorney, Agent, or Firm—Carl G. Ries; Jack H. Park

[57] ABSTRACT

A method is provided for obtaining wide band seismograms made from a plurality of narrow band seismic surveys using vibrator type sources. Several different narrow frequency band seismograms are obtained using vibrator type signal sources. The narrow band seismogram having different frequency band responses are stacked, or added together, to provide a single wide band seismogram having improved signal to noise characteristics.

6 Claims, 13 Drawing Figures

SEISMIC SURVEYING METHOD

BACKGROUND OF THE INVENTION

The invention relates to a method for generating wide-band seismograms while simultaneously suppressing correlated noise signals.

This method can be applied advantageously but not exclusively to seismic exploration in which the seismic energy radiated into the ground is generated by means of one or more vibrators. As a rule these vibrators allow a signal to be transmitted with controlled pre-defined frequency content. As with all other energy sources which act on the surface of the earth a substantial proportion of the generated seismic energy does not penetrate into the ground but is propagated along or near the surface, for example in the form of surface waves or ground-coupled air waves and in the form of shallow refracted waves. Owing to their slow amplitude reduction these noise waves, which are causally associated with signal generation and are therefore called correlated noise signals, usually have amplitudes which are greater than the body waves, hereinafter referred to as desired signals, which penetrate into the ground and are reflected to the earth's surface from interfaces of formations with different elastic properties. It is common practice to install a plurality of geophones, also denoted as receivers, in one line in the profile direction, i.e. in the direction from the energy source to the receivers, so that the ground motion recorded by the geophone is not controlled exclusively by the waves which are propagated along the earth's surface or at least close to the earth's surface. The use of so-called transmitter groups, i.e. a plurality of signal sources, installed in the profile direction and adapted to operate simultaneously or sequentially, hereinafter also referred to as transmitters, also serves to suppress the surface-coupled noise signals apart from increasing the signal energy relative to the ambient noise.

In this context serial configurations in the profile direction are equivalent to area configurations which additionally suppress noise signals which arrive on the receiver side from the side and are usually unrelated to signal generation. The arrangement of transmitters and receivers in a line works as a wavelength filter and to a high degree attenuates waves whose apparent wavelength is of the same order of magnitude or smaller than the length of the transmitter and/or receiver group. For this reason transmitter and receiver groups will be referred to hereinbelow also as wavelength filters. The method of operation of receiver and transmitter groups and the calculation of their attenuation curves have been described in detail in the relevant literature (inter alia Th. Krey, F. Toth; Remarks on Wavenumber Filtering in the Field, Geophysics, 38, pages 959-970, 1973).

DETAILED DESCRIPTION

Figure 1A:
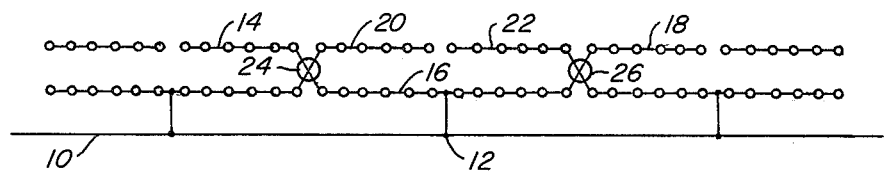
FIGS. 1a, b and c, 2a, b and c, and 3a, b, c and d are schematic representations showing various geophone groupings and connections according to the invention.

The "apparent wavelength" mentioned above refers to a distance on the earth's surface which, when projected into the propagation direction of the waves, is equal to the actual wavelength.

The apparent wavelength is therefore equal to the actual wavelength for surface-coupled waves whose propagation direction is parallel to the earth's surface. The apparent wavelength is equal to the actual wavelength divided by the cosine of the angle between the propagation direction and the earth's surface for body waves which are reflected from the subsurface.

In like manner the apparent propagation velocity of the waves, referred to as apparent velocity, on the earth's surface is equal to the actual propagation velocity divided by the cosine of the angle between the propagation direction of the waves and the earth's surface.

Given a constant propagation velocity v and a horizontal reflector, the apparent velocity $v_s$ of the desired signal, a reflected body wave, is defined by the expression $$v_s = v \sqrt{v^2 t_o^2 / x^2 + 1} \qquad (1)$$

where the so-called two-way time $t_o$, refers to the transmit time of a signal from the earth's surface to the reflector and back, the incidence angle of the signal on the reflector being 90° and for this reason the signal—being reflected into itself-returning to the same place on the surface from which it was transmitted. The variable x which also occurs in Equation (1) refers to the distance between the signal source or transmitter group centre and the receiver or receiver group centre.

Equation (1) remains at least approximately valid if the velocity in the underground is not constant but depends on the depth. In this case v must be replaced by a mean value referred to as the RMS-velocity. Hereinafter, v will always refer to the RMS-velocity.

Equation (1) shows that the apparent velocity of the desired signal $v_s$ will always be greater than the mean value of the propagation velocity. On the other hand, with shallow reflecting horizons (small values of $t_o$) and/or large distances x between the transmitter and receiver, the difference between $v_s$ and the velocities of noise waves ($v_{noise} = v_n$) may become so small that the longest wavelength of the noise waves will be greater than the smallest wavelength of the desired signal. For wavelength filtering to be meaningful the regions of the noise signal wavelengths ($\lambda_n$) and desired signal wavelengths ($\lambda_s$) must not overlap each other. Instead they must be so clearly separated that all noise signal wavelengths will be in the cut-off region but the desired signal wavelengths will all be in the pass band region of the wavelength filter. This condition is in conflict with the requirement to transmit signals with the greatest possible wide-band characteristics, i.e. signals in which the ratio $f_o/f_u$ of upper frequency limit $f_o$ to the lower frequency limit $f_u$, usually measured in octaves, is as large as possible because only these signals will have the required resolving power.

If $v_{n,max}$ and $\lambda_{n,max}$ denote the maximum velocity and maximum wavelength respectively, of the noise signals and $v_s$ and $\lambda_{s,min}$ denote the apparent velocity and the smallest apparent wavelength respectively, of the desired signal, then $$\lambda_{n,max} = v_{n,max}/f_u < v_s/f_o = \lambda_{s,min} \quad (2)$$

This condition restricts the bandwidth of the desired signal to $$f_o/f_u < v_s/v_{n,max} \quad (3)$$

It is therefore necessary either to dispense with wavelength filtering sufficient to suppress the noise signals or to accept the fact that the recorded seismogram will also have a narrow-band characteristic due to the transmitted narrow-band signal and/or the wavelength filtering.

It is therefore the object of this invention to disclose a method for preparing wide-band seismograms while simultaneously suppressing the correlated noise signals.

Wide-band seismograms are produced by addition (stacking) of a plurality of a narrow-band recordings, hereinafter also referred to as individual seismograms. These individual seismograms are generated by means of at least two narrow-band signals with different frequency ranges whereby the transmitter and/or receiver groups while retaining their centres, signal and the maximum wavelength of the noise signal obtained, in the manner described above. This means that prior to the transmission of a new signal with a different frequency range the receiver groups and/or transmitter groups will be altered so that the desired signal wavelength of the new signal will also be in the pass band region but the noise signals will be in the cut-off region of the wavelength filter. It is of course necessary to take care that the centres of the transmitter and receiver groups are not altered in connection with the changes of the transmitter and receiver groups necessary for the transmission of a new signal. A plurality of narrow-band signals are therefore transmitted to generate a single seismogram and the frequency content of such signals is selected so that all signals together cover the required wide frequency range. A wide-band seismogram is generated by summation of the individual seismograms generated with the narrow-band signals.

If $f_{u,m}$ and $f_{o,m}$ denote the lower and upper frequency limits, respectively, of the $m^{th}$ of M narrow-band signals, then $$f_{o,m}/f_{u,m} < v_s/v_{n,max} \quad (4)$$

so that the longest wavelength of the noise signal is shorter than the shortest wavelength of the desired signal.

If the upper frequency limit of the $m^{th}$ signal is equal to the lower frequency limit of the $(m+1)^{th}$ signal, $$f_{o,m} = f_{u,m+1}$$

i.e. if the narrow-band signals thus cover a continuous frequency range from $$f_u = f_{u,1} \text{ to } f_o = f_{o,M}$$

and if furthermore $$f_{o,m}/f_{u,m} = c < v_s/v_{n,max},$$

where c is a constant, then $$c^M = f_o/f_u. \quad (5)$$

This provides a lower limit for the number of narrow-band signals M which are necessary to cover the frequency range $[f_u, f_o]$:

$$M < \ln(f_o/f_u)\ln(v_s/v_{n,max}). \quad (6)$$

The condition $f_{o,m} = cf_{u,m}$ need of course only be approximately satisfied. Generally, the upper and lower frequency limits will be defined in integers (i.e. 45 Hz instead of, for example, 44.72 Hz).

EXAMPLE

The invention will be explained by the following exemplified description of the individual steps of the method:

(1) First the desired frequency coverage of the seismogram is defined (for example: $f_u = 20$ Hz, $f_o = 100$ Hz).

(2) The maximum velocity of the noise signals is determined in known manner by noise analysis (for example: $v_{n,max} = 1800$ m/s for a refracted wave). The longest noise wavelength is obtained from (1) and (2) as $$\lambda_{n,max} = v_{n,max}/f_u = 90 \text{ m}.$$

(3) The apparent velocity $v_s$ of the required signal is determined in accordance with Equation (1) from the two-way time $t_o$ associated with the shallowest reflector of interest from the distance x between transmitter group centre and the centre of the receiver group farthest from the transmitter and from the RMS-velocity (for example from $t_o = 1$ s, $x = 100$ m and $v = 255$ m/s follows). By using only a signal with a frequency content of 20–100 Hz the shortest apparatus wavelength of the desired signal in this example would be $\lambda_{s,min} = v_s/f_o = 67.3$ m, i.e. shorter than the longest wave-length of the noise signals, $$\lambda_{n,max} = v_{n,max}/f_u = 90 \text{ m}.$$

(4) The minimum number of narrow-band signals is determined by means of the expression (6) (for example: $M > 1.22$ is obtained since $f_o/f_u = 5$ and $v_s/v_{n,max} = 3.739$).

(5) The number of narrow-band signals and their frequency limits are defined (for example: $M = 2$, $c = (f_o/f_u)^{1/M} = 2.236$, $f_{u,1} = 20$ Hz, $f_{o,1} = 45$ Hz, $f_{u,2} = 45$ Hz, $f_{o,2} = 100$ Hz).

(6) The shortest wavelength of the desired signal and the longest wavelength of the noise signal is determined for each narrow-band signal (for example: $\lambda_{,max} = 90$ m, $\lambda_{s,min} = 149.6$ m for the 20/45 Hz signal and $\lambda_{n,max} = 40$ m, $\lambda_{s,min} = 67.3$ for the 45/100 Hz signal).

(7) Transmitter and receiver groups are selected in known manner for each of the M signals so that $\lambda_{s,min}$ will be in the pass band region but $\lambda_{n,max}$ will already be in the cut-off region of the wavelength filter.

(8) Performance of the measurement in which each of the M signals is radiated at least once by the associated transmitter group and the ground motion is recorded by means of the associated receiver group and changing of the transmitter and receiver groups associated with the signal change does not cause any alteration of the centres of the transmitter and receiver groups. After recording all individual seismograms which are to be generated with the same transmitter and receiver group centres, the transmitter and receiver group centres, the transmitter group centres and receiver group centres are shifted in conventional manner by a specific distance in the profile direction and the above-described procedure of signal transmission and recording is repeated.

The individual seismograms recorded with unvaried transmitter group centres and receiver group centres and originating from the same narrow-band signals are added (stacked) in conventional manner and are correlated with this signal. The correlated individual seismograms are also stacked and produce the final wide-band seismogram.

If the frequency ranges of the signals do not overlap substantially ($f_{o,m} \leq f_{u,m+1}$) it is also possible to stack the individual seismograms generated by all signals with the same transmitter group centres and receiver group centres prior to correlation, to correlate the stacked seismogram with each of the narrow-band signals and to stack the correlated seismograms. Another option is to stack all individual seismograms produced with the same transmitter group centres and receiver group centres and to correlate them with a signal comprising the sum of all transmitted narrow-band signals. This sum can be weighted in order to produce a specific signal power spectrum.

For conventional swept frequency signals, also referred to as linear sweeps, in which the frequency varies linearly with respect to time, the power density and frequency range is constant and proportional to $$T(f_o - f_u)$$

where T denotes the signal duration. For the signals employed in this context, in which the quotient $f_{o,m}/f_{u,m}$ but not the difference $f_{o,m} - f_{u,m}$ is approximately constant, the spectral power density of the different signals will vary (the higher the frequency of the signal, the lower will be the spectral power density). If an at least approximately constant power density is required over the entire frequency range ($f_u, f_o$) the signals of higher frequency must be made longer and/or the signals of higher frequency must be transmitted more often. In quantitative terms, the expression $[T_m/(f_{o,m} - f_{u,m})]N_m$, the product of signal duration $T_m$ divided by the difference between the upper and lower frequency limit, ($f_{o,m} - f_{u,m}$) and the number of transmissions $N_m$ of the $m^{th}$ signal with unchanged transmitter and receiver groups, must be constant for all signals. Minor differences between the actual and desired spectral power density can also be compensated for by weighted stacking of the individual seismograms generated by different narrow-band signals or by correlation with the weighted, stacked narrow-band signals. It is convenient for the individual seismograms generated by narrow-band signals to be deconvoluted in known manner prior to stacking with another narrow-band signal, in order to reverse the effect of attenuation since even in the pass range wavelength filters will apply stronger attenuation to short wavelength than to long wavelengths and the desired signal in its entirety is therefore attenuated in dependence on frequency.

The change of cut-off and pass band region of the receiver groups can be embodied most readily if the receivers can be addressed singly or in small groups. A method of this kind is disclosed in the U.S. Pat. No. 3,887,897 (E. B. Neitzel, et al) for marine seismic. However, this method suffers from the disadvantage that a change of the length of the receiver groups also results in a shift of their centres.

If it is possible to operate with two different narrow-band signals (M=2), it is possible to employ the arrangement and receiver circuit to be described hereinbelow.

In this configuration every receiver group comprises three subgroups of receivers. One such subgroup could consist of one more geophone strings of the kind commonly employed at present, in which six geophones are connected in series. One of these subgroups is permanently associated with the same receiver group. Two further subgroups, which are different for long and short geophone groups, are connected to the permanent subgroup by switch control. When projected into the profile direction the subgroup temporarily connected to the permanent subgroup for long receiver groups covers a substantially different region than that covered by the permanent subgroup. The subgroups temporarily connected to the permanent subgroup for generating a short receiver group on the other hand largely cover the same region as the permanent subgroup when projected in the profile direction.

The principle by which each receiver group is built up from subgroups of which one is permanently associated with the same receiver group and each of the other temporary subgroups is associated in pairs with different receiver groups, depending on the desired receiver group length can evidently be employed for constructing receiver groups with more than the abovementioned two different lengths. By using 2n temporary subgroups arranged in pairs symmetrically with respect to the centre of the permanent subgroup in addition to the permanent subgroup, it will be possible to switch up to n+1 receiver groups of different length with the same receiver group centres. The expression "in pairs symmetrically with respect to the centre of the permanent subgroup" is to indicate that it is only the projection into the profile direction of the two subgroups which must be symmetrical with respect to the centre of the permanent subgroup.

The position of the switches which alter the lengths of the receiver subgroups can also be controlled by radio (H. C. Hibbard, U.S. Pat. No. 3,624,599). It is also possible to control the switch position through a second cable or an unused conductor pair of the main cable. It is possible to operate without the use of an additional conductor for the control signal of the switches by controlling the switches with the aid of a code signal which is transmitted through all conductor pairs of the seismic cable to the switches of the receiver groups.

FIG. 1a indicates the manner in which such subgroups of some of which are marked with the numbers 14, 16, 18, 20 and 22, are connected to the seismic cable 10 by means of taps one of which is identified by the numeral 12. The permanent subgroup in this case comprises twelve receivers (two geophone strings), each of the temporary subgroup comprising six receivers (one geophone string), symbolized by circles. The subgroup 16 is always connected to the tapping 12. Depending on the position of the switches 24 and 26, either the subgroups 14 and 18 or the subgroups 20 and 22 are connected to the tapping 12 in addition to the above-mentioned permanent subgroup.

Figure 1B:
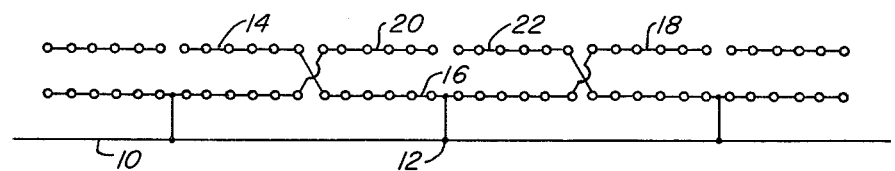

FIG. 1b shows the switch position in the event that the subgroup 14, 16 and 18 are associated with the tapping 12 (long receiver group).

Figure 1C:
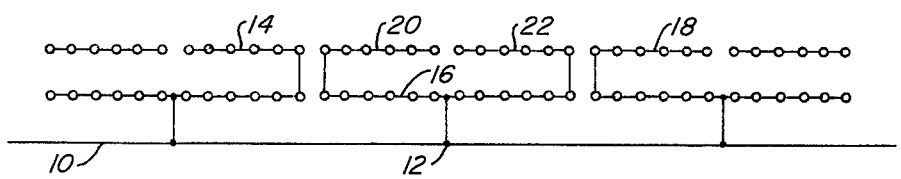

FIG. 1c shows the switch position if the subgroups 20, 16 and 22 are associated with the tapping 12 (short receiver group).

Figure 2A:
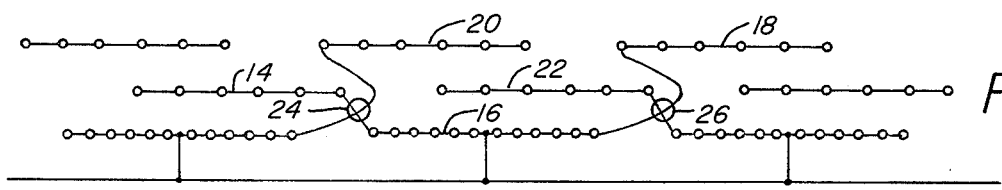

FIG. 2a shows another combination of subgroups of which some are marked by the numerals 14, 16, 18, 20 and 22. In this case a permanent subgroup also comprises twelve receivers and a temporary subgroup comprises six receivers. Either short or long receiver groups are established, depending on the position of the switches 24 and 26.

Figure 2B:
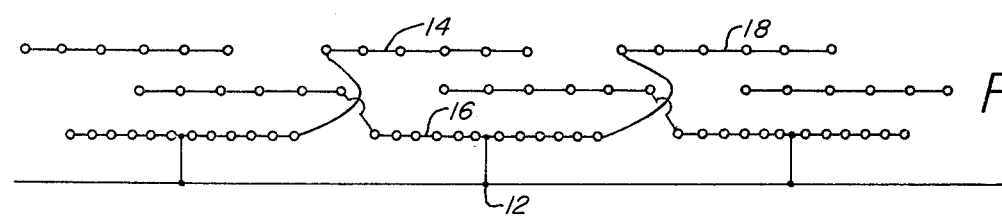

FIG. 2b shows the switch position if the subgroups 14, 16 and 18 are associated with the tapping 12 (long receiver group).

Figure 2C:
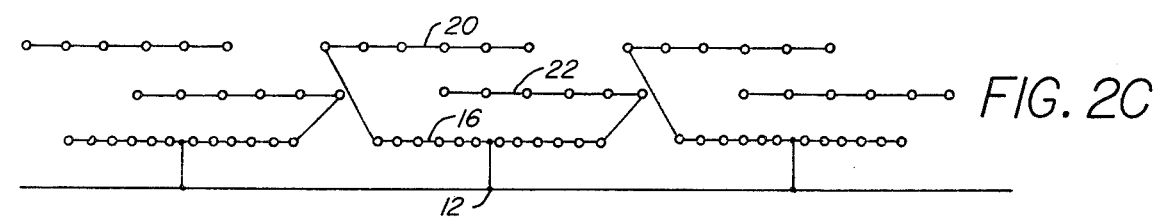

FIG. 2c shows the switch position if the subgroups 20, 16 and 22 are associated with the tapping 12 (short receiver group).

Figure 3A:
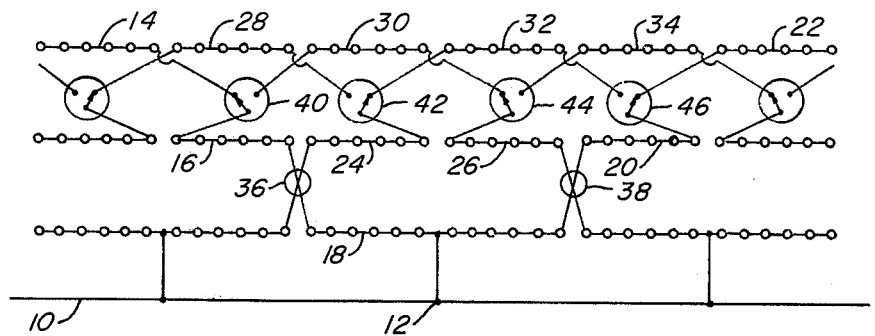

FIG. 3a shows subgroups built by analogy to the arrangements in FIG. 1a for establishing receiver groups of three different lengths. In this case one permanent subgroup, for example the subgroup 16 connected to the tapping 12 of the seismic cable 10, also comprises twelve receivers and a temporary subgroup comprises six receivers. Depending on the position of the switches 36 and 38, the permanent subgroup 16 is connected to the subgroups 18 and 20 or to the subgroups 24 and 26. The switch 40 connects the subgroups 14 and 30 to the subgroup 18, the switch 42 connects the subgroups 28 or 32 to the subgroup 24, the switch 44 connects the subgroups 30 and 34 to the subgroup 26 and the switch 46 connects the subgroups 32 or 22 to the subgroup 20.

Figure 3B:
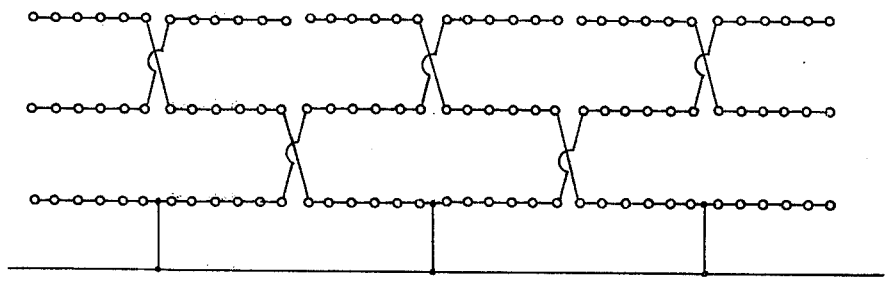

FIG. 3b shows the connections between the subgroups if a long receiver group is required.

Figure 3C:
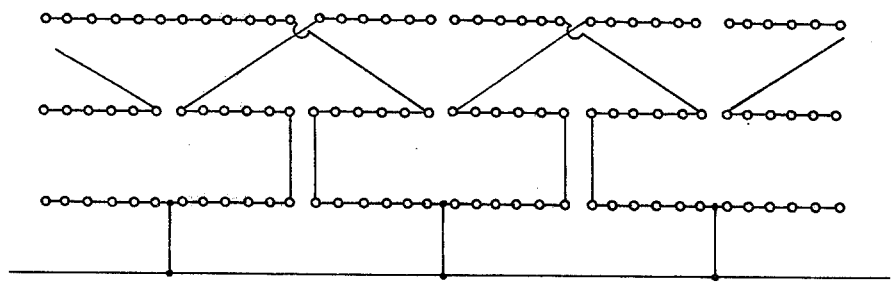

FIG. 3c shows the connections between the subgroups if a medium receiver group is required.

Figure 3D:
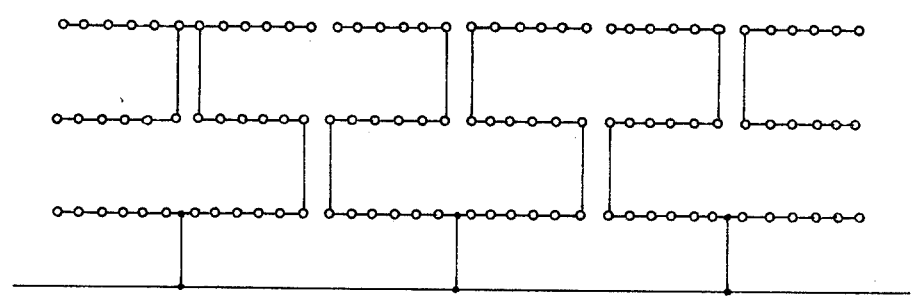

FIG. 3d shows the connections between the subgroups if a short receiver group is required.

Figure 4:
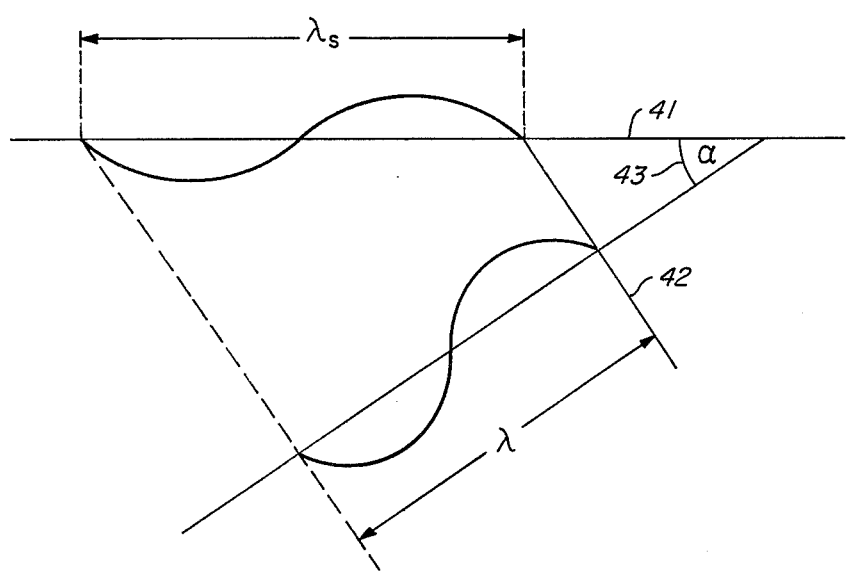
FIG. 4 is a graphical representation showing the relationship between actual and apparent wavelength.

FIG. 4 shows the relation between the true wavelength $\lambda$ of a plane body wave arriving at an angle from below and having the wave front 42 and the apparent wavelength $\lambda_{s,max}$ which occurs on the earth's surface 41. The relationship $\lambda_{s,max} = \lambda/\cos \alpha$ is obtained from the illustrated geometry where $\alpha$ refers to the angle marked 43 between the propagation direction of the wave (perpendicularly to the wave front 2) and the earth's surface 41.

Figure 5:
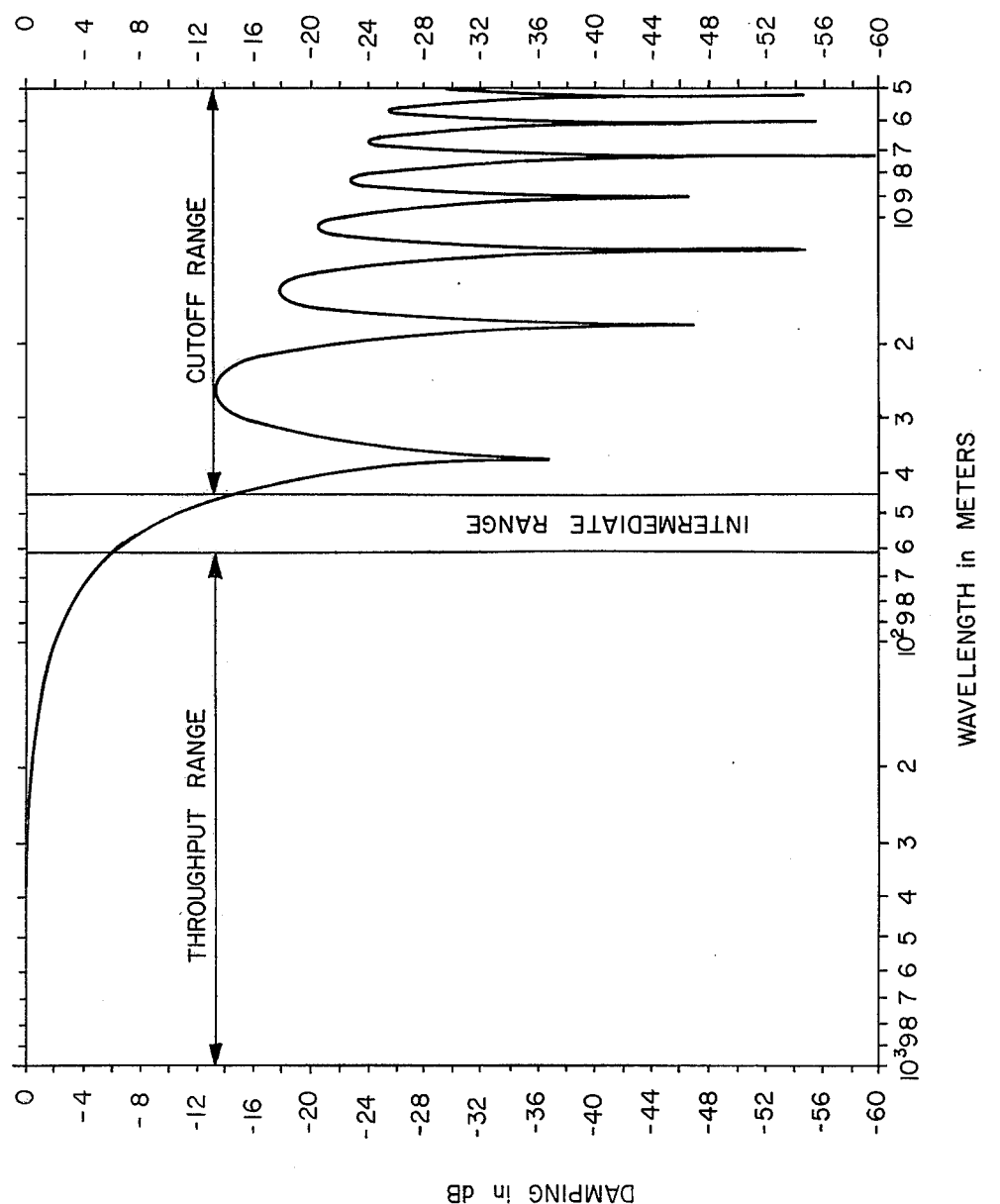
FIGS. 5 and 6 are graphical representations showing the attenuation afforded by receiver groups in accordance with the invention.

FIG. 5 shows the attenuation curve of a receiver group of 35 m length comprising twenty-four equidistant elements. All wavelengths above 60 m are in the pass region (defined for an attenuation of less than 6 dB). All wavelengths below 45 m are in the cut-off region.

Figure 6:
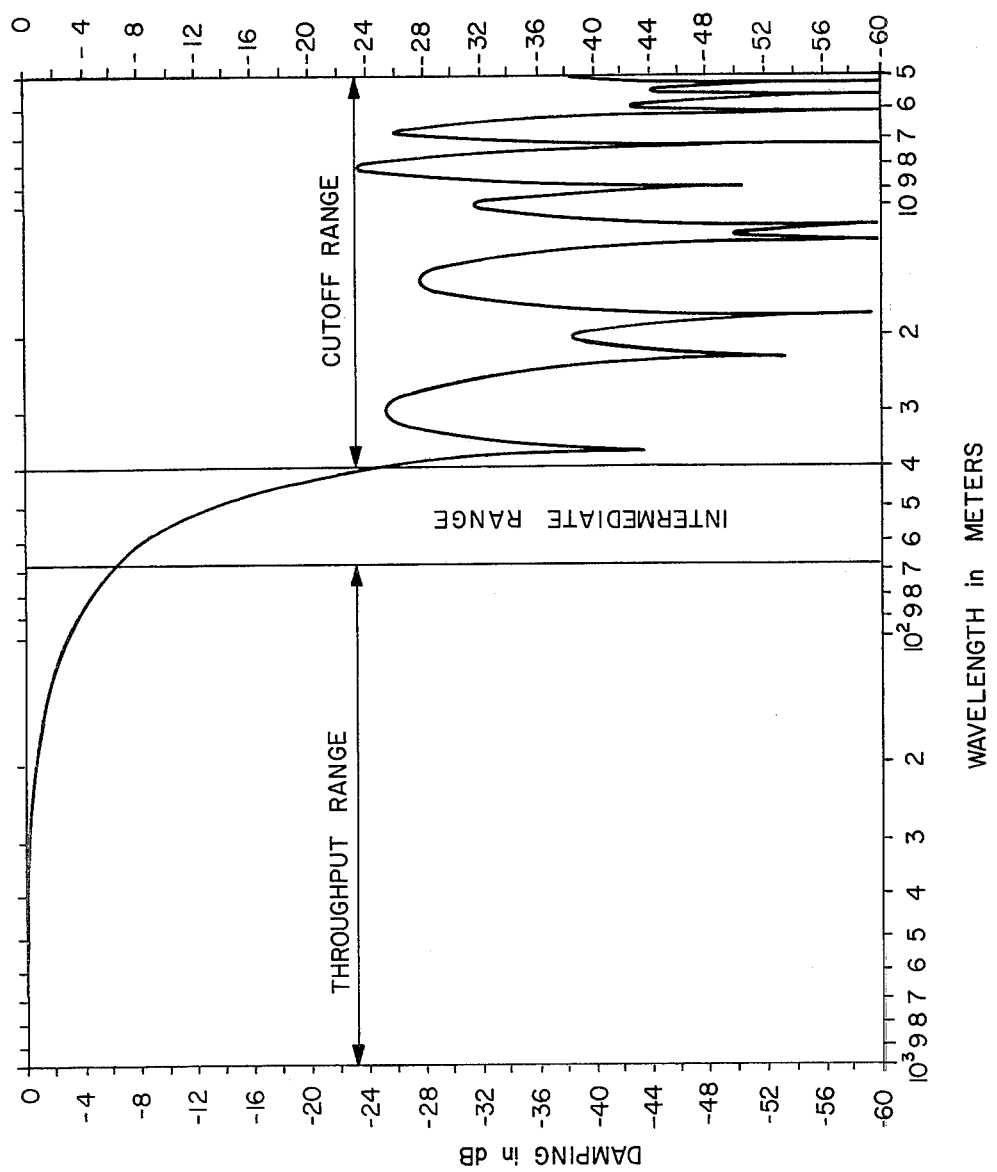

FIG. 6 shows the attenuation curve of a receiver group of 35 m length, comprising twenty-four equidistant receivers, combined with a transmitter group of 15 m length and comprising three elements. All wavelengths above 67 m are in the pass region and all wavelengths below 40 m are in the cut-off region.

I claim:

1. A method of seismic surveying employing a vibrator type seismic signal source controllable to generate seismic signals in selected, relatively narrow, frequency ranges, and employing at least one seismic receiver group comprising a plurality of individual seismic receivers electrically interconnected and arranged so that different combinations of individual receivers corresponding to different selected frequency ranges of said signal source may be activated to receive seismic signals, said electrical interconnections being such that an output signal corresponding to the sum of signals received by the activated individual receivers is produced comprising the steps of:

(a) generating seismic signals from said source in a first, relatively narrow frequency band;

(b) activating individual seismic receivers as a function of said first narrow frequency band to form an activated receiver group and selected so that the ratio of the lower frequency limit to the upper frequency limit of said first frequency band is smaller than the ratio of the maximum velocity of surface noise waves to the apparent velocity of reflected seismic waves from an investigation depth of interest, and generating a first narrow band seismogram in response to said first narrow band signal generation, whereby the surface wave noise signals are within the cut off region of said activated receiver group;

(c) generating seismic signals from said source in a second, relatively narrow frequency band;

(d) activating individual seismic receivers as a function of said second narrow frequency band to form an activated receiver group and selected so that the ratio of the lower frequency limit to the upper frequency limit of said second frequency band is smaller than the ratio of the maximum velocity of surface noise waves to the apparent velocity of reflected seismic waves from an investigation depth of interest, and generating a second narrow band seismogram in response to said second narrow band signal generation, whereby the surface wave noise signals are within the cut off region of said activated receiver group;

(e) correlating said first and second seismogram with said first and second generated signals to form first and second correlated seismograms; and (f) summing said first and second correlated seismograms to produce a single, wide band seismogram.

2. The method of claim 1 wherein the steps are performed for three or more relatively narrow frequency bands.

3. The method of claim 1 wherein said first and second narrow band seismograms are summed prior to correlation and the summed seismogram is then correlated with a sum generated signal of said first and second frequency band signals.

4. The method of claim 3 wherein the steps are performed for three or more relatively narrow frequency bands.

5. The method of claim 1 wherein the activated receiver groups comprises an odd number $2n+1$, where n is an integer number, of which a permanent subgroup is always associated with the same receiver group and the other 2n temporary subgroups are arranged so that their projection toward a profile direction is symmetrical with respect to the center of the permanent subgroup.

6. The method of claim 2 wherein the activated receiver groups comprise an odd number $2n+1$, where n is an integer number, of which a permanent subgroup is always associated with the same receiver group and the other 2n temporary subgroups are arranged so that their projection toward a profile direction is symmetrical with respect to the center of the permanent subgroup.

* * * * *